US009939270B2

(12) United States Patent
Furuhata

(10) Patent No.: US 9,939,270 B2
(45) Date of Patent: Apr. 10, 2018

(54) PHYSICAL QUANTITY SENSOR ELEMENT, PHYSICAL QUANTITY SENSOR, ELECTRONIC EQUIPMENT, AND MOVABLE BODY

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 209 days.

(21) Appl. No.: 14/844,639

(22) Filed: Sep. 3, 2015

(65) Prior Publication Data
US 2016/0069685 A1 Mar. 10, 2016

(30) Foreign Application Priority Data

Sep. 5, 2014 (JP) ................................ 2014-181047

(51) Int. Cl.
G01C 19/5747 (2012.01)
G01C 19/574 (2012.01)

(52) U.S. Cl.
CPC ................................ G01C 19/574 (2013.01)

(58) Field of Classification Search
CPC .............................................. G01C 19/5747
See application file for complete search history.

(56) References Cited

U.S. PATENT DOCUMENTS

| 6,089,088 A | 7/2000 | Charvet |
| 6,289,733 B1 | 9/2001 | Challoner et al. |
| 6,321,598 B1 | 11/2001 | Iwaki et al. |
| 6,415,663 B1* | 7/2002 | Mochida ............ G01C 19/5719 73/504.12 |
| 6,766,689 B2 | 7/2004 | Spinola Durante et al. |
| 6,892,575 B2 | 5/2005 | Nasiri et al. |
| 6,915,693 B2* | 7/2005 | Kim .................... G01C 19/5762 73/504.12 |
| 8,443,668 B2* | 5/2013 | Ohms ................ G01C 19/5747 73/504.12 |
| 8,549,919 B2 | 10/2013 | Gunthner et al. |
| 8,978,742 B2 | 3/2015 | Lin et al. |

(Continued)

FOREIGN PATENT DOCUMENTS

| JP | H11-337345 A | 12/1999 |
| JP | 2000-329562 A | 11/2000 |
| JP | 2000-337884 A | 12/2000 |

(Continued)

Primary Examiner — John Chapman, Jr.
(74) Attorney, Agent, or Firm — Harness, Dickey & Pierce, P.L.C.

(57) ABSTRACT

A physical quantity sensor element is provided with a detecting portion, a driving portion, a beam portion which connects a detecting portion and the driving portion to each other, and in which the beam portion includes a branched portion. The beam portion includes two mass portion side beam portions which extend from two position of the driving portion, which are different from each other, and two supporting portion side beam portions which extend from two positions of the detecting portion, which are different from each other, and in which both end portions on the detecting portion side of two mass portion side beam portions are connected to each other, and both end portions on the driving portion side of two supporting portion side beam portions are connected to each other.

14 Claims, 10 Drawing Sheets

(56) References Cited

U.S. PATENT DOCUMENTS

2006/0010978 A1    1/2006   Lee et al.
2013/0298672 A1   11/2013   Kuhlmann et al.

FOREIGN PATENT DOCUMENTS

| JP | 2001-021360 A | 1/2001 |
| JP | 2006-030205 A | 2/2006 |
| JP | 2006-153514 A | 6/2006 |
| JP | 2007-509346 A | 4/2007 |
| JP | 2009-085715 A | 4/2009 |
| JP | 2013-096952 A | 5/2013 |

* cited by examiner

PHYSICAL QUANTITY SENSOR ELEMENT, PHYSICAL QUANTITY SENSOR, ELECTRONIC EQUIPMENT, AND MOVABLE BODY

BACKGROUND

1. Technical Field

The present invention relates to a physical quantity sensor element, a physical quantity sensor, electronic equipment, and a movable body.

2. Related Art

Recently, as a physical quantity sensor element using a silicon micro electro mechanical system (MEMS) technology, for example, a capacitance type gyro sensor element (an angular velocity sensor) for detecting angular velocity has been known (for example, refer to JP-T-2007-509346).

For example, an angular velocity sensor according to JP-T-2007-509346 includes two mass portions which are indirectly connected to a frame thereof. The two mass portions are connected via a link device so as to necessarily move to an opposite direction along a Z direction. It is possible to sense the angular velocity of the sensor about a Y-axis by causing the two mass portions to vibrate through a reverse phase in the Z direction, and measuring the amplitude of angular vibration which is applied to the frame.

However, in the angular velocity sensor disclosed in JP-T-2007-509346, a hinge for connecting each of mass portions and a frame to each other is greatly deformed, and it is not possible to efficiently transfer Coriolis effect which acts on the mass portion to the frame, thereby resulting in deterioration of detection accuracy.

SUMMARY

An advantage of some aspects of the invention is to provide a physical quantity sensor element having excellent detection accuracy, or a physical quantity sensor which is provided with the physical quantity sensor element, electronic equipment, and a movable body.

The invention can be realized in the following forms or application examples.

Application Example 1

According to this application example of the invention, there is provided a physical quantity sensor element including: a supporting portion; a mass portion; and a beam portion which connects the supporting portion and the mass portion to each other, in which the beam portion includes a branched portion.

According to the physical quantity sensor element as described above, the beam portion includes a branched portion, and thus it is possible to enhance the bending rigidity of the beam portion in the direction in which Coriolis effect acts on the mass portion. For this reason, it is possible to efficiently transfer Coriolis effect to the supporting portion from the mass portion, and as a result, it is possible to reduce the occurrence of leakage vibration and, to increase the detection accuracy.

Application Example 2

In the physical quantity sensor element according to the application example, it is preferable that the beam portion includes two mass portion side beam portions which extend from two positions in the mass portion, which are different from each other, and both end portions on the supporting portion side of the two mass portion side beam portions are connected to each other.

As such, it is possible to enhance the rigidity of the beam portion in the direction in which Coriolis effect acts on the mass portion with a simple configuration.

Application Example 3

In the physical quantity sensor element according to the application example, it is preferable that a width of an end portion on the mass portion side of each of the mass portion side beam portions is greater than a width of a middle portion of each of the mass portion side beam portions.

As such, it is possible to enhance the rigidity of the beam portion in the direction in which Coriolis effect acts on the mass portion with a simple configuration.

Application Example 4

In the physical quantity sensor element according to the application example, it is preferable that the beam portion includes two supporting portion side beam portions which extend from the two positions in the supporting portion, which are different from each other, and both end portions on the mass portion side of the two supporting portion side beam portions are connected to each other.

As such, it is possible to enhance the rigidity of the beam portion in the direction in which Coriolis effect acts on the mass portion with a simple configuration.

Application Example 5

In the physical quantity sensor element according to the application example, it is preferable that a width of the end portion on the supporting portion side of each of the supporting portion side beam portions is greater than a width of a middle portion of each of the supporting portion side beam portions.

As such, it is possible to enhance the rigidity of the beam portion in the direction in which Coriolis effect acts on the mass portion with a simple configuration.

Application Example 6

In the physical quantity sensor element according to the application example, it is preferable that the beam portion includes two branched beam portions which are branched from the middle of the beam portion, and both end portions on the mass portion side of the two branched beam portions are connected to each other, and both end portions on the supporting portion side of the two branched beam portions are connected to each other.

As such, it is possible to enhance the rigidity of the beam portion in the direction in which Coriolis effect acts on the mass portion with a simple configuration.

Application Example 7

According to the physical quantity sensor element according to the application example, it is preferable that the physical quantity sensor element further includes a first mass portion and a second mass portion which respectively form the mass portion; a first supporting portion and a second supporting portion which respectively form the supporting portion; a first beam portion which forms the beam portion for connecting the first mass portion and the first supporting portion; a second beam portion which forms the beam portion for connecting the second mass portion and the second supporting portion; and a coupling portion which connects the first mass portion and the second mass portion to each other.

As such, the first mass portion and the second mass portion are caused to vibrate in a reverse phase, and thereby it is possible to more reduce the occurrence of leakage vibration by cancelling the caused vibration.

Application Example 8

In the physical quantity sensor element of the application example, it is preferable that one end portion of the coupling portion is connected to a portion in the first mass portion, and the other end portion of the coupling portion is connected to a portion in the second mass portion, the first mass portion is connected to the one end portion of the coupling portion, and includes the first easily deformable portion which is deformable so as to reduce a change of a posture of the first mass portion with respect to a reference surface, and the second mass portion is connected to the other end portion of the coupling portion, and includes the second easily deformable portion which is deformable so as to reduce a change of a posture of the second mass portion with respect to the reference surface.

As such, it is possible to further more reduce the occurrence of leakage vibration by reducing the change of the posture of the first mass portion and the second mass portion.

Application Example 9

In the physical quantity sensor element according to the application example, it is preferable that the first mass portion includes a first gap portion in which the first easily deformable portion is disposed, and the second mass portion includes a second gap portion in which the second easily deformable portion is disposed.

As such, with a relatively simple configuration, it is possible to maintain a constant posture of the first mass portion and the second mass portion with respect to the reference surface. It is possible to form the first mass portion and the first easily deformable portion on the same substrate. In the same manner, is possible to form the second mass portion and the second easily deformable portion on the same substrate.

Application Example 10

In the physical quantity sensor element according to the application example, it is preferable that the physical quantity sensor element further includes an electrode which detects vibration of the first supporting portion and the second supporting portion along the reference surface.

As such, it is possible to detect displacement of the first supporting portion and the second supporting portion caused by Coriolis effect which acts on the first mass portion and the second mass portion when driving the first mass portion and the second mass portion in an out-the plane direction by the physical quantity sensor. For this reason, it is possible to realize an angular velocity sensor.

Application Example 11

According to this application example of the invention, there is provided a physical quantity sensor including the physical quantity sensor element of the above-described application example of the invention, and a package which stores the physical quantity sensor element.

As such, it is possible to provide the physical quantity sensor having the excellent detection accuracy.

Application Example 12

According to this application example of the invention, there is provided electronic equipment including the physical quantity sensor element of the above-described application example of the invention.

As such, it is possible to provide the electronic equipment which includes the physical quantity sensor element having the excellent detection accuracy.

Application Example 13

According to this application example of the invention, there is provided a movable body including the physical quantity sensor element of the above-described application example of the invention.

As such, it is possible to provide the movable body which includes the physical quantity sensor element having the excellent detection accuracy.

BRIEF DESCRIPTION OF THE DRAWINGS

The invention will be described with reference to the accompanying drawings, wherein like numbers reference like elements.

FIG. 4A is a plan view and FIG. 4B is a sectional view.

DESCRIPTION OF EXEMPLARY EMBODIMENTS

Hereinafter, a physical quantity sensor element, a physical quantity sensor, electronic equipment and a movable body of the invention will be described in detail based on preferred embodiments shown in the accompanying drawings.

1. Physical Quantity Sensor

First, an embodiment of the physical quantity sensor (a physical quantity sensor which is provided with a physical quantity sensor element) of the invention will be described.

First Embodiment

Figure 1:
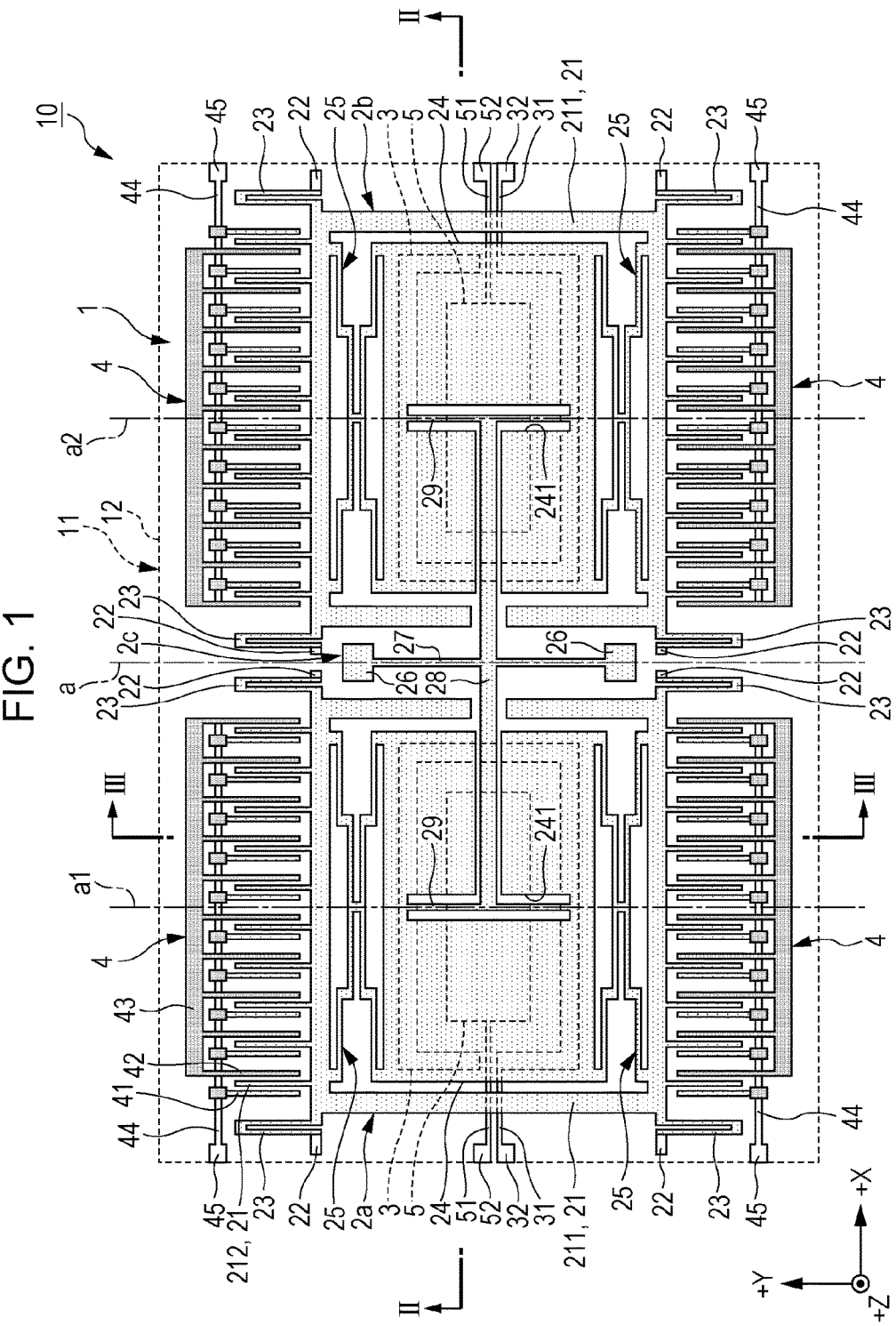
FIG. 1 is a plan view illustrating a physical quantity sensor according to a first embodiment of the invention.
Figure 2:
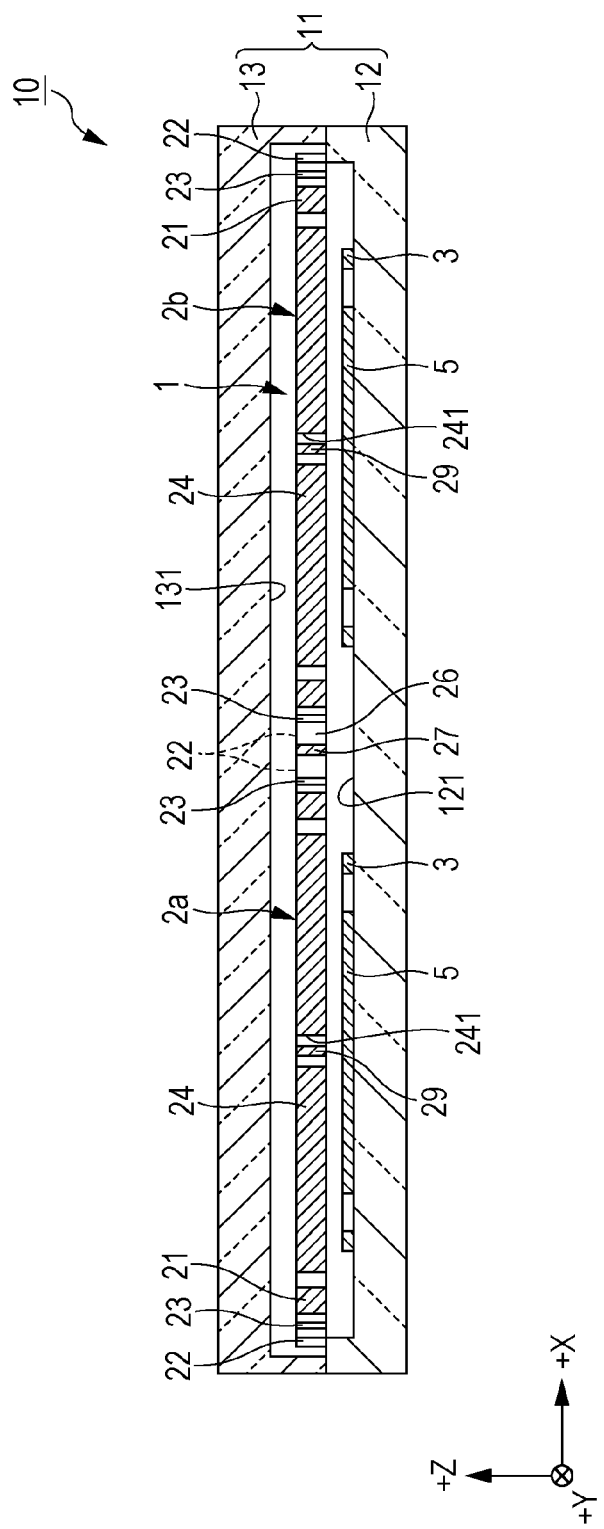
FIG. 2 is a sectional view taken along line IIA-IIA in FIG. 1.
Figure 3:
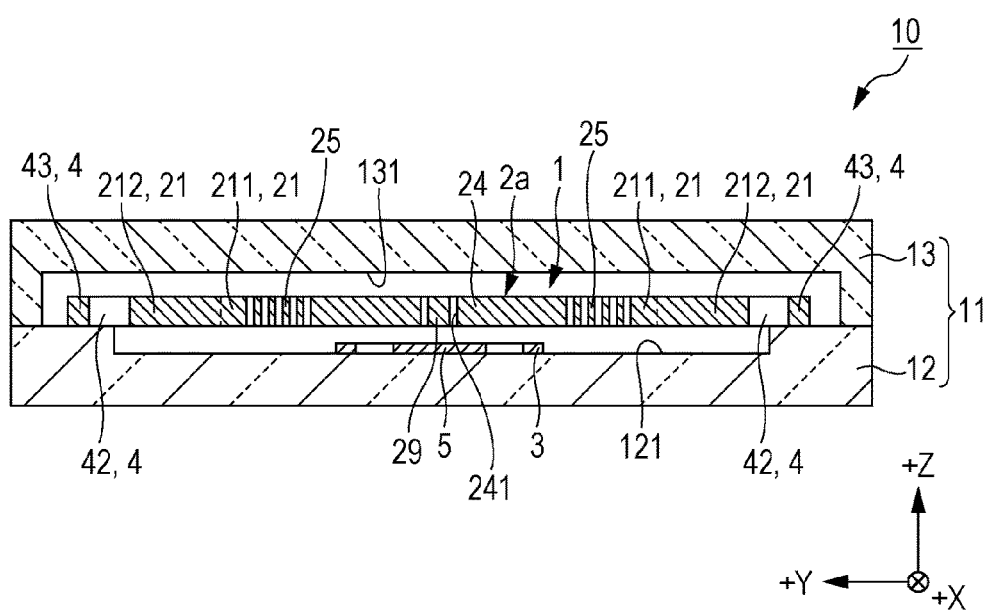
FIG. 3 is a sectional view taken along line IIB-IIB in FIG. 1.
Figure 4:
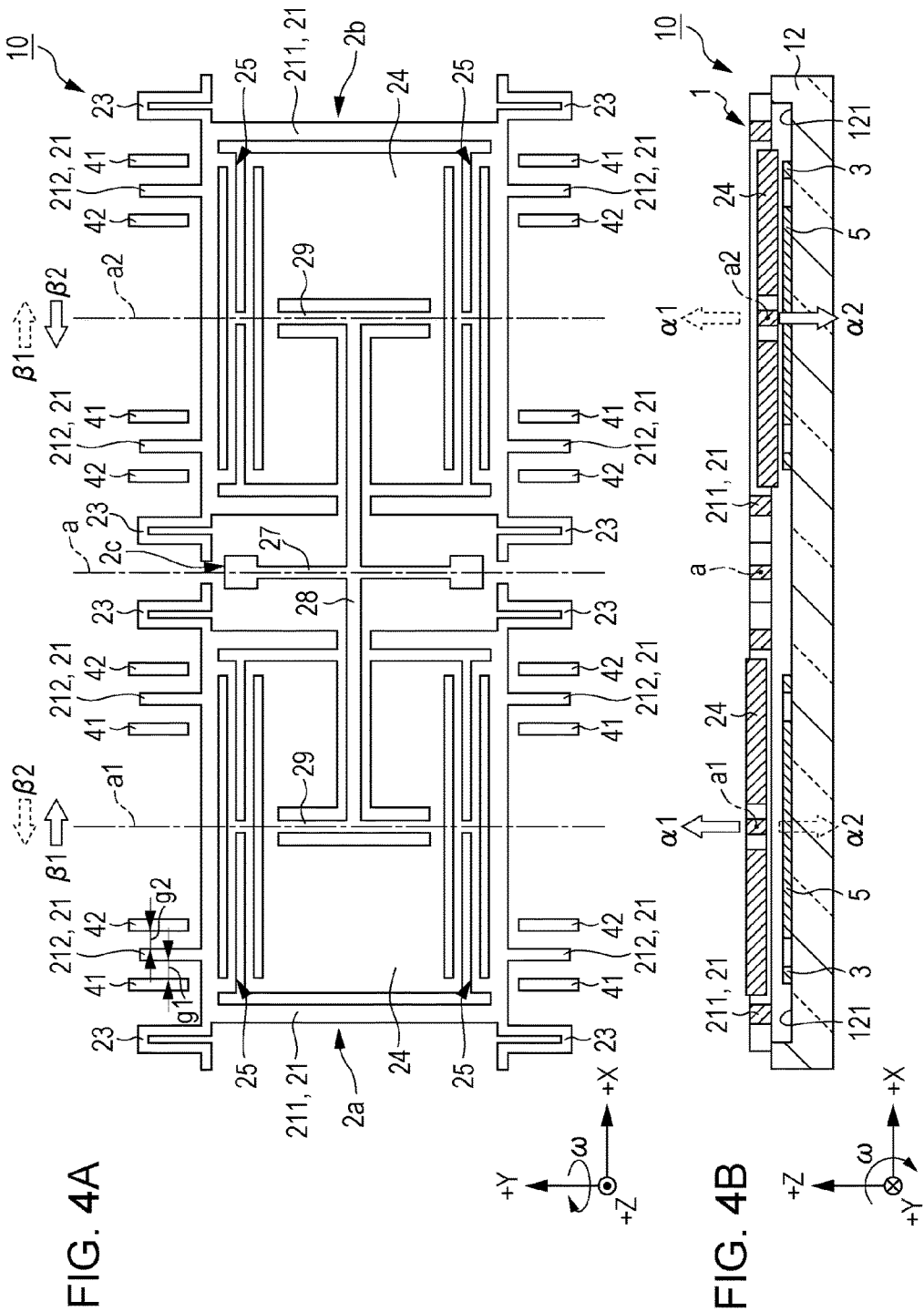
FIG. 4A and FIG. 4B are schematic diagrams for illustrating an operation of the physical quantity sensor illustrated in FIG. 1.
Figure 5:
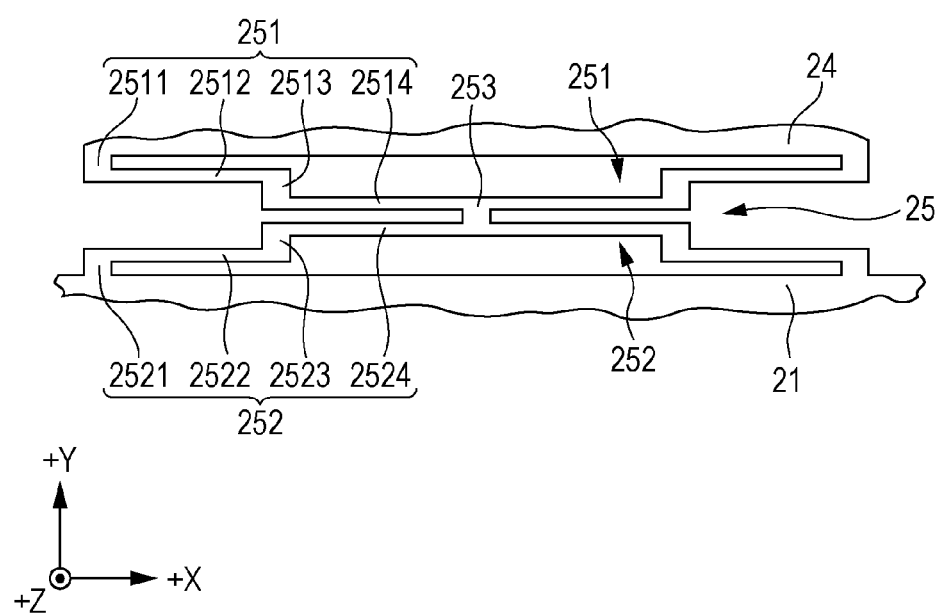
FIG. 5 is an enlarged plan view for illustrating a beam portion with which the physical quantity sensor illustrated in FIG. 1 is provided.

FIG. 1 is a plan view illustrating the physical quantity sensor according to the first embodiment of the invention, FIG. 2 is a sectional view taken along line IIA-IIA in FIG. 1, and FIG. 3 is a sectional view taken along line IIB-IIB in FIG. 1. In addition, FIG. 4A and FIG. 4B are schematic diagrams for illustrating an operation of the physical quantity sensor illustrated in FIG. 1, and FIG. 4A is a plan view and FIG. 4B is a sectional view. FIG. 5 is an enlarged plan view for illustrating a beam portion with which the physical quantity sensor illustrated in FIG. 1 is provided.

Meanwhile, in the drawings, for convenience of explanation, three axes of an X-axis (a third axis), a Y-axis (a second axis), and a Z-axis (a first axis) which are orthogonal to each other are indicated by arrows, and a tip end side of the arrow is set to be "+ (positive)", and a base end side is set to be "− (negative)". In addition, in the following description, a direction parallel to the X-axis is referred to as an "X-axis direction", a direction parallel to the Y-axis is referred to as a "Y-axis direction", and a direction parallel to the Z-axis is referred to as a "Z-axis direction". In addition, in the following description, for convenience of explanation, an upper side (a side of +Z-axis direction) and a lower side (a side of −Z-axis direction) in FIG. 2 and FIG. 3 are respectively referred to as "up" and "down".

A physical quantity sensor 10 as illustrated in FIG. 1 is a gyro sensor for detecting an angular velocity about the Y-axis. The physical quantity sensor 10 is provided with a physical quantity sensor element 1 which is a gyro element, and a package 11 which stores the physical quantity sensor element 1, as illustrated in FIG. 2 and FIG. 3.

Package

The package 11 is provided with a base substrate 12 (a substrate) for supporting the physical quantity sensor element 1, and a lid member 13 which is bonded to the base substrate 12, and a space for storing the physical quantity sensor element 1 is formed between the base substrate 12 and the lid member 13. Meanwhile, the base substrate 12 may form a portion of the physical quantity sensor element 1.

Each of the base substrate 12 and the lid member 13 is formed into a plane-shape and is disposed along an XY plane (a reference surface) which is a plane including the X-axis and the Y-axis. In addition, a recessed portion 121 which has a function of preventing a vibrating portion (a portion from which the fixing portion 22 of vibration structures 2a and 2b described below is removed) of the physical quantity sensor element 1 from coming in contact with the base substrate 12 is provided on an upper surface (that is, a surface on the side on which the physical quantity sensor element 1 is provided) of the base substrate 12. With this, the base substrate 12 can support the physical quantity sensor element 1 while allowing the physical quantity sensor element 1 to be driven. In addition, a recessed portion 131 which is formed so as to cover the physical quantity sensor element 1 in a non-contact manner on the lower surface (that is, a surface on the side which is bonded to the base substrate 12) of the lid member 13. With this, it is possible to form a space for storing the physical quantity sensor element 1 between the base substrate 12 and the lid member 13 while allowing the physical quantity sensor element 1 to be driven.

Meanwhile, in the drawings, each of the base substrate 12 and the lid member 13 may be formed of one member, or may be formed of two or more members by being bonded. For example, the base substrate 12 or the lid member 13 may be formed by bonding a frame-shaped member and a plane-shaped member.

A bonding method of the base substrate 12 and the lid member 13 is different according to a constituent material of the base substrate 12 and the lid member 13, and thus is not particularly limited, for example, it is possible to use a bonding method by using a bonding material such as an adhesive and a brazing material, and a solid bonding method such as a direct bonding method or an anodic bonding method.

In addition, the constituent material of the base substrate 12 is not particularly limited, but is preferable to use a material having insulating properties, specifically, it is preferable to use a silicon material having high resistance and a glass material, and particularly preferable to use a glass material (for example, borosilicate glass such as Pyrex glass (registered trademark)) containing alkali metal ion (a movable ion). Therefore, when the vibration structures 2a and 2b is mainly formed of silicon, it is possible to anodically bond the base substrate 12 and the vibration structures 2a and 2b.

In addition, the constituent material of the lid member 13 is not particularly limited, for example, it is possible to use the same material as that of the aforementioned base substrate 12.

Each of the base substrate 12 and the lid member 13 can formed by using, for example, a photolithography method and an etching method.

Physical Quantity Sensor Element

The physical quantity sensor element 1 is provided with two vibration structures 2a and 2b, a coupling structure 2c for connecting two of the vibration structures 2a and 2b to each other, two driving fixed electrode portions 3 for exciting the driving vibration on the vibration structures 2a and 2b, four detecting fixed electrode portions 4 for detecting the detecting vibration of the vibration structures 2a and 2b, and two electrodes for driving monitor 5 for detecting a driving state of the vibration structures 2a and 2b. Hereinafter, each portion of the physical quantity sensor element 1 will be described in order.

Vibration Structure

The vibration structures 2a and 2b are arranged in the X-axis direction. The vibration structures 2a and 2b have the same configuration to each other except for being symmetrically disposed in FIG. 1, and each of the vibration structures 2a and 2b is provided with the detecting portion 21, four fixing portions 22 which are fixed onto the base substrate 12 in the package 11, four beam portions 23 which connect the detecting portion 21 and the four fixing portions 22, a driving portion 24, and two beam portions 25 which connect the detecting portion 21 and the driving portion 24. Here, in the vibration structure 2a, the beam portion 25 corresponds to a "first beam portion (a beam portion)", the beam portion 23 corresponds to a "third beam portion", the fixing portion 22 corresponds to a "first fixing portion" the driving portion 24 corresponds to a "first mass portion (a mass portion)", and the detecting portion 21 corresponds to a "first supporting portion (a supporting portion)". In addition, in the vibration structure 2b, the beam portion 25 corresponds to a "second beam portion (a beam portion)", the beam portion 23 corresponds to a "fourth beam portion", the fixing portion corresponds to a "second fixing portion", the driving portion 24 corresponds to a "second mass portion (a mass portion)", and the detecting portion 21 corresponds to a "second supporting portion (a supporting portion)".

The vibration structures 2a and 2b are integrally formed with the structure 2c. In addition, as a constituent material of the vibration structures 2a and 2b, for example, it is possible to use silicon to which conductive property is imparted by being doped with an impurity such as phosphorus or boron. In addition, the vibration structures 2a and 2b are collectively formed with the coupling structure 2c by processing (for example, an etching process) one substrate (for example, a silicon substrate).

Detecting Portion (First and Second Supporting Portions)

The detecting portion 21 which is provided with each of the vibration structures 2a and 2b includes a frame portion 211 and a detecting movable electrode portion 212 which is provided in the frame portion 211.

The frame portion 211 is formed into a frame shape in which a part is chipped in the circumferential direction in planar view (hereinafter, simply referred to as "in planar view") from the Z-axis direction. Specifically, the frame portion 211 is formed of a pair of first portions which extend along the X-axis direction so as to be parallel to each other, the second portion which extends along the Y-axis direction and connects one side of the ends of the pair of the first portion to each other, and a pair of third portion which extend along the Y-axis direction so as to face each other from the other side of the ends of the pair of first portions.

The detecting movable electrode portion 212 is formed of a plurality of electrode fingers which extend along the Y-axis direction from each of the first portions of the aforementioned frame portion 211. Meanwhile, the number of these electrode fingers may be arbitrary without being limited to the number shown in the drawings.

First and Second Fixing Portions

The four fixing portions 22 which are provided with each of the vibration structures 2a and 2b are bonded and fixed on the upper surface of the base substrate 12 on the outside of the recessed portion 121 of the base substrate 12 in the package 11. The bonding method is different according to a constituent material of the base substrate 12 and the fixing portion 22, and thus is not particularly limited, for example, it is possible to use a solid bonding method such as a direct bonding method or an anodic bonding method.

The four fixing portions 22 are respectively disposed to be spaced from each other at the outside of the detecting portion 21 on the outside of the detecting portion in planar view. In the embodiment, the four fixing portions 22 are disposed at a position corresponding to each of corner portions (each connecting portion between the first portion, the second portion, and the third portion) of the frame portion 211 of the detecting portion 21 in planar view.

Third and Fourth Beam Portions

The four beam portions 23 which are provided with each of the vibration structures 2a and 2b correspond to each of corner portions of the frame portion 211 of the detecting portion 21 in planar view, and each of four beam portions 23 is connected to the corresponding to detecting portion 21 and the fixing portion 22.

Each of the beam portions 23 is formed into a meandering shape which extends along the X-axis direction while reciprocating in the Y-axis direction, in planar view. With this, it is possible to increase the length of each of the beam portions 23 while still realizing miniaturization. It is possible to easily displace the detecting portion 21 in the X-axis direction in accordance with bending deformation of each of the beam portions 23 by increasing the length of each of the beam portions 23.

Here, each of the beam portions 23 includes a portion which extends along the Y-axis direction, and a portion which extends along the X-axis direction, but the length of the portion which extends along the Y-axis direction is longer than the length of the portion which extends along the X-axis direction. With this, the bending deformation of each of the beam portions 23 is reduced in the Y-axis direction, and thus it is possible to reduce the displacement of the detecting portion 21 in accordance with the bending deformation of each of the beam portions 23 in the X-axis direction.

Note that, each of the beam portions 23 may not be formed into the meandering shape as described above, and, for example, may be formed into a shape which extends along the Y-axis direction in planar view.

In addition, the width (the length which extends along the X-axis direction) of each of the beam portions 23 is smaller than the thickness (the length which extends along the Z-axis direction) of each of the beam portions 23. In other words, the thickness of each of the beam portions 23 is larger than the width of each of the beam portions 23. With this, each of the beam portions 23 is likely to be bent and deformed in the X-axis direction, and is not likely to be bent and deformed in the Z-axis direction. That is, a spring constant of each of the beam portions 23 in the Z-axis direction is larger than the spring constant of each of the beam portions 23 in the X-axis direction. For this reason, it is possible to reduce the displacement of the detecting portion 21 in the Z-axis direction while allowing the detecting portion 21 to be easily displaced to the X-axis direction in accordance with the bending deformation of each of the beam portions 23. Note that, the spring constants of the entire beam portions 23 in the Z-axis direction are larger than the spring constants of the entire beam portions 23 in the X-axis direction.

Driving Portion (First and Second Mass Portions)

The driving portion 24 which is provided with each of the vibration structures 2a and 2b is disposed on the inside of the frame portion 211 of the detecting portion 21. When the upper surface of the base substrate 12 in the package 11 is set to be a reference surface, the driving portion 24 is formed into a plane-shape which extends along the reference surface. In the embodiment, the driving portion 24 is formed into a rectangular shape which extends along the shape of the frame portion 211.

In addition, the beam portion 29 which extends along the Y-axis direction is provided in the driving portion 24. Both ends of each of the beam portions 29 are fixed to the corresponding driving portion 24. Here, the driving portion 24 is provided with a gap portion 241 in which the beam portion 29 is disposed. Note that, the gap portion 241 of one the driving portion 24 corresponds to a "first gap portion", and the gap portion 241 of the other driving portion 24 corresponds to a "second gap portion".

First and Second Beam Portions (Beam Portions)

The two beam portions 25 which are provided with each of the vibration structures 2a and 2b correspond to four corner portions of the frame portion 211 and four corner portions of the driving portion 24, and each of the two beam portions 25 connects the corresponding detecting portion 21 and the driving portion 24.

Each of the beam portions 25 is provided with a pair of one end portions connected to two positions of the driving portion 24 which are separated from each other in the X-axis direction, and a pair of the other end portions connected to two positions of the detecting portion 21 in the X-axis direction. Each of the beam portions 25 is configured to extend to the side of the detecting portion 21 from each of the pair of one end portions, and to extend the side of the driving portion 24 from each of the pair of the other end portions so as to be together at one position in the middle. The beam portion 25 includes a branched portion. With this, it is possible to enhance the bending rigidity of the beam portion 25 in the direction in which Coriolis effect is acts on the driving portion 24 (the X-axis direction). For this reason, it is possible to efficiently transfer Coriolis effect to the detecting portion 21 from the driving portion 24, and as a result, it is possible to reduce the occurrence of leakage vibration and, to increase the detection accuracy.

To be more Specific, each of the beam portion 25 is, as illustrated in FIG. 5, provided with a pair of beam portions 251 on the mass portion which extend to the detecting portion 21 (the supporting portion) from the driving portion 24 (the mass portion), and a pair of support side beam portions 252 which extend to the driving portion from the detecting portion 21, and a connecting beam portion 253 which connects the beam portions 252 and the beam portions 252 to each other at one position.

In order to make one mass portion side beam portion 251 and the other mass portion side beam portion 251 face each other, the pair of mass portion side beam portions 251 extend toward the detecting portion 21 from the driving portion 24, and end portions of the pair of mass portion side beam portions 251, which are on the side opposite to the driving portion 24, are connected to each other. In addition, the pair of mass portion side beam portions 251 are formed so as to be symmetrically to each other in the X-axis direction.

The each of the mass portion side beam portions 251 are formed as stepwise in which the direction along the Y-axis direction and the direction along the X-axis direction are alternatively extend to the detecting portion 21 from the driving portion 24. That is, each of the mass portion side beam portions 251 is provided with a section 2511 which extends along the Y-axis direction from the driving portion 24, a section 2512 which extends in the direction along the X-axis direction from the end portion on the side opposite to the driving portion 24 of the section 2511, a section 2513 which extends along the Y-axis direction from the end portion on the side opposite to the section 2511 of the section 2512, and a section 2514 which extends along the X-axis direction from the end portion on the side opposite to the section 2512 of the section 2513.

In the same way, the pair of support side beam portions 252 extends toward the driving portion 24 from the detecting portion 21 in such a manner that one end portion of the support side beam portions 252 faces the other end of the support side beam portions 252, and both end portions on the side opposite to the detecting portion 21 of the pair of support side beam portions 252 are connected to each other. In addition, the pair of support side beam portions 252 are formed so as to be symmetrically to each other in the X-axis direction.

Each of the support side beam portions 252 are formed as the stepwise in which the direction along the Y-axis direction and the direction along the X-axis direction are alternatively extend to the detecting portion 21 from the driving portion 24. That is, each of the support side beam portions 252 is provided with a section 2521 which extends along the Y-axis direction from the detecting portion 21, a section 2522 which extends in the direction along the X-axis direction from the end portion on the side opposite to from the detecting portion 21 of the section 2521, a section 2523 which extends along the Y-axis direction from the end portion on the side opposite to the section 2521 of the section 2522, and a section 2524 which extends along the X-axis direction from the end portion on the side opposite to the section 2522 of the section 2523.

The connecting beam portion 253 extends along the Y-axis direction, and one end portion thereof is connected to an end portion (that is, an end portion on the side opposite to the section 2513 of the section 2514) on the side opposite to the driving portion 24 of each of the mass portion side beam portions 251, and the other end portion thereof is connected to an end portion (that is, an end portion on the side opposite to the section 2523 of the section 2524) on the side opposite to the detecting portion 21 of each of the support side beam portions 252.

As described, it can be said that the beam portion 25 is branched from the connecting beam portion 253 to the pair of mass portion side beam portions 251 on the driving portion 24 side, and is branched from the connecting beam portion 253 to the pair of support side beam portions 252 on the detecting portion 21.

Here, each of the beam portions 25 is provided with sections 2512, 2514, 2522, and 2524 which extend along the X-axis direction, the sections 2511, 2513, 2521, and 2523 which extend along the Y-axis direction, and the connecting beam portion 253, but the length of each section which extends along the X-axis direction is longer than the length of each section which extends along the Y-axis direction. With this, the bending deformation of each of the beam portions 25 is reduced in the X-axis direction, and thus it is possible to reduce the displacement of the driving portion 24 in accordance with the bending deformation of each of the beam portions 25 in the X-axis direction. For this reason, it is possible to efficiently transfer Coriolis effect which occurs in the driving portion 24 in the X-axis direction to the detecting portion 21 via the beam portion 25. In addition, in each of the beam portions 25, while a portion of each of the beam portions 25, which extends along the X-axis direction is to be twisted and bent when the driving portion 24 is displaced to the Z-axis direction, a portion of each of the beam portions 25, which extends along the Y-axis direction is inclined to the Z-axis direction. At this time, the portion of each of the beam portions 25, which extends in the Y-axis direction is hardly deformed; however, the portion of each of the beam portions 25 is inclined as described above, and thus functions as a displacement expanding mechanism for expanding the displacement of the driving portion 24 in the Z-axis direction in accordance with the length in the aforementioned portion.

In addition, by decreasing the length of each section of each of the beam portions 25, which extends along the Y-axis direction, it is possible to reduce a gap between the portions of the beam portions 25, which extend along the X-axis direction, a gap between the portion of each of the beam portions 25, which extends along the X-axis direction and the detecting portion 21, and a gap between the portion of each of the beam portions 25, which extends along the X-axis direction and the driving portion 24. With this, it is possible to regulate or limit the bending deformation of each of the beam portions 25 in the Y-axis direction, and as a result, it is possible to reduce the displacement of the driving portion 24 in the Y-axis direction.

In addition, the length of each of the beam portions 25 is longer than the length of each of the beam portions 23. With this, each of the beam portions 25 is likely to be bent and deformed in the Z-axis direction compared to each of the beam portions 23. That is, the spring constant of each of the beam portions 25 in the Z-axis direction is smaller than the spring constant of each of the beam portions 23 in the Z-axis direction. Meanwhile, since the number of the beam portions 25 is the same as the number of the beam portions 23, the spring constants of the entire beam portions 25 in the Z-axis direction is smaller than the spring constants of the entire beam portions 23 in the Z-axis direction.

Coupling Structure

As illustrated in FIG. 1, the coupling structure 2c is disposed between the two vibration structures 2a and 2b. The coupling structure 2c is provided with two fixing portions 26, a support beam portion 27 for connecting the two fixing portions 26 to each other, and a coupling portion which is supported by the support beam portion 27 and couples the beam portions 29 of the vibration structures 2a and 2b with each other.

The two fixing portions 26 are arranged in the Y-axis direction. Then, the support beam portion 27 for connecting the two fixing portions 26 to each other extends in the Y-axis direction. In addition, the coupling portion 28 extends in the X-axis direction, and one end portion is connected to a middle portion of one beam portion 29 and the other end portion is connected to a middle portion of the other beam portion 29. In addition, in planar view, the coupling portion 28 and the support beam portion 27 intersect with each other, and thus a middle portion of the coupling portion 28 is connected to a middle portion of the support beam portion 27.

Driving Fixed Electrode

Each of the two driving fixed electrode portions 3 is fixed on the bottom surface of the recessed portion 121 which is formed on the base substrate 12 in the package 11. Each of the driving fixed electrode portions 3 is disposed to face the corresponding driving portion 24 at a predetermined interval. Here, each of the driving fixed electrode portions 3 is disposed at a position overlapping the corresponding driving portion 24 in planar view. In the embodiment, each of the driving fixed electrode portions 3 is formed into a substantially annular shape along the outer periphery of the corresponding driving portion 24 in planar view.

The driving fixed electrode portion 3 is electrically connected to a terminal 32 which is provided on the outer side of the recessed portion 121 on the upper surface of the base substrate 12 via a wiring 31.

Examples of a constituent material of each of the driving fixed electrode portion 3, the wiring 31, and the terminal 32 include a transparent electrode material such as ITO (indium tin oxide), and a metallic material such as ZnO (zinc oxide), gold (Au), a gold alloy, platinum (Pt), aluminum (Al), an aluminum alloy, silver (Ag), a silver alloy, chromium (Cr), a chrome alloy, copper (Cu), molybdenum (Mo), niobium (Nb), tungsten (W), iron (Fe), titanium (Ti), cobalt (Co), zinc (Zn), and zirconium (Zr).

In addition, the driving fixed electrode portion 3, the wiring 31, and the terminal 32 are collectively formed by patterning a film, which is formed by using the aforementioned material through a gas phase deposition method such as a sputtering method, and a vapor deposition method, through a photolithography method and an etching method. Meanwhile, in a case where the base substrate 12 is formed of a semiconductor material such as silicon, it is preferable that an insulating layer is provided between the driving fixed electrode portion 3, the wiring 31, the terminal 32, and the base substrate 12. Examples of the constituent material of the insulating layer include $SiO_2$ (silicon oxide), AlN (aluminum nitride), SiN (silicon nitride), and the like.

Detecting Fixed Electrode

Each of the four detecting fixed electrode portions 4 is bonded and fixed onto the upper surface of the base substrate 12 on the outer side of the recessed portion 121 of the base substrate 12 in the package 11. The four detecting fixed electrode portions 4 are formed of two detecting fixed electrode portions 4 (a first detecting electrode) for detecting the detecting vibration of the vibration structure 2a, and two detecting fixed electrode portions 4 (a second detecting electrode) for detecting the detecting vibration of the vibration structure 2b. The two detecting fixed electrode portions 4 for detecting the detecting vibration of the vibration structure 2a is arranged in the Y-axis direction so as to interpose the vibration structures 2a therebetween. In the same manner, the two detecting fixed electrode portions 4 for detecting the detecting vibration of the vibration structure 2b is arranged in the Y-axis direction so as to interpose the vibration structures 2b therebetween.

These four detecting fixed electrode portions 4 are collectively formed with the two vibration structures 2a and 2b, and the coupling structure 2c by processing (for example, an etching process) one substrate (for example, a silicone substrate).

Each of the detecting fixed electrode portions 4 is formed of a plurality of electrode fingers 41 and a plurality of electrode fingers 42 which are arranged to be adjacent to each other in the X-axis direction, and a connecting portion 43 which connects end portions to each other on the side opposite to the vibration structures 2a and 2b of a plurality of electrode fingers 42.

Each of the electrode fingers 41 and 42 extends along the Y-axis direction. Thus, each of the electrode fingers 41 faces one side surface of the electrode finger of the detecting movable electrode portion 212, and each of the electrode fingers 42 faces the other side surface of the electrode finger of the detecting movable electrode portion 212. When each of the electrode fingers 41 and 42 is disposed in this way, and thus the detecting portion 21 is displaced to the X-axis direction, among an electrostatic capacity between the electrode finger 41 and the electrode finger of the detecting movable electrode portion 212, and an electrostatic capacity between the electrode finger 42 and the electrode finger of the detecting movable electrode portion 212, one electrostatic capacity is increased, and the other electrostatic capacity is decreased.

The connecting portion 43 has a function of securing conduction between the plurality of electrode fingers 42. With this, it is possible to enhance the reliability of the electrical connection between each of the electrode fingers 42 and a wiring 44 described below.

Such a detecting fixed electrode portion 4 is electrically connected to a terminal 45 which is provided on the outside of the recessed portion 121 on the upper surface of the base substrate 12 via the wiring 44. A constituent material and a method of forming the wiring 44 and the terminal 45 are the same those in the driving fixed electrode portion 3, the wiring 31, and the terminal 32.

Electrode for Driving Monitor

Each of the two electrodes for driving monitor 5 is bonded and fixed onto the bottom surface of the recessed portion 121 which is formed on the base substrate 12 in the package 11. Each of the electrodes for driving monitor 5 is disposed to face the corresponding driving portion 24 at a predetermined interval. Here, each of the electrodes for driving monitor 5 is disposed at a position overlapping the corresponding driving portion 24 in planar view. In the embodiment, each of the electrodes for driving monitor 5 is disposed on the inside of the driving fixed electrode portion 3 which is formed into the aforementioned annular shape in planar view, and overlaps the center portion of the corresponding driving portion 24.

Such an electrode for driving monitor 5 is electrically connected to the terminal 52 which is provided on the outside of the recessed portion 121 on the upper surface of the base substrate 12 via a wiring 51.

A constituent material and a method of forming the method of the electrode for driving monitor 5, the wiring 51, and the terminal 52 are the same those in the driving fixed electrode portion 3, the wiring 31, and the terminal 32.

The physical quantity sensor 10 which is configured as described above, is operated as follows.

A periodically changing voltage (for example, an AC voltage) is applied as the driving voltage between the driving fixed electrode portion 3 and the driving portion 24 which face to each other. Then, an electrostatic attraction force having a strength that is periodically changed occurs between the driving fixed electrode portion 3 and the driving portion 24, and thereby, the driving portion 24 vibrates in the Z-axis direction in accordance with the elastic deformation of the beam portion 25.

At this time, a voltage which is applied between the driving fixed electrode portion 3 of the vibration structure 2a and the driving portion 24, and a voltage which is applied between the driving fixed electrode portion 3 of the vibration structure 2b and the driving portion 24 have shifted phases by 180° in relation to each other. With this, the driving portion 24 of the vibration structure 2a and the driving portion 24 of the vibration structure 2b vibrate through a reverse phase. That is, as illustrated in FIG. 4B, a state where the aforementioned one driving portion 24 is displaced to a direction α1 which corresponds to a +Z-axis direction, and the aforementioned other driving portion 24 is displaced to a direction α2 which corresponds to a −Z-axis direction, and a state where the aforementioned one driving portion 24 is displaced to a direction α2, and the aforementioned other driving portion 24 is displaced to a direction α1 are alternately repeated. With this, it is possible to reduce leakage vibration. Meanwhile, FIG. 4B illustrates a case where the driving portion 24 on the left side of the drawing is displaced to the direction α1, and the driving portion 24 on the right side of the drawing is displaced to the direction α2.

In addition, at this time, the coupling portion 28 is inclined while the support beam portion 27 is twisted about an axis a1 which extends along the Y-axis direction. With this, it is possible to cause the driving portion 24 to vibrate such that the amplitude of each of the two driving portions 24 which are connected to both ends of the coupling portion 28. At that time, the beam portion 29 of one driving portion 24 is twisted about the axis a1 which extends along the Y-axis direction while the beam portion 29 of the other driving portion 24 is twisted about the axis a2 which extends along the Y-axis direction. Here, one end portion of the coupling portion 28 is connected to a portion on the inside of one driving portion 24 (the first mass portion), and the other end portion of the coupling portion 28 is connected to a portion on the inside of the other driving portion 24 (the second mass portion). Accordingly, in accordance with the twist deformation of the beam portion 29 described above, it is possible to keep a state where each of the driving portions 24 are parallel to the XY plane.

In addition, at this time, the electrostatic capacity between the electrode for driving monitor 5 and the driving portion 24 is detected, and then, based on the detection result, a driving voltage is controlled as required. Therefore, it is possible to control in such a manner that the vibration of the driving portion 24 becomes a desired vibration. Further, it is possible to detect the vibration of the driving portion 24 in the direction along a normal line of the reference surface by using the each of the driving fixed electrode portions 3.

As described above, in a state of causing the driving portion 24 to vibrates, if the angular velocity about the Y-axis is applied to the physical quantity sensor 10, the Coriolis effect acts in the driving portion 24 in the X-axis direction, and thus the detecting portion 21 vibrates in the X-axis direction due to the action of the Coriolis effect. That is, as illustrated in FIG. 4A, a state where one detecting portion 21 is displaced to a direction β1 which corresponds to a +X-axis direction, and the other detecting portions 21 is displaced to a direction β2 which corresponds to a −X-axis direction, and a state where the aforementioned one detecting portion 21 is displaced to the direction β2, and the other detecting portion 21 is displaced to the direction β1 are alternately repeated. With this, the electrostatic capacity between the electrode fingers 41 and 42 of the detecting fixed electrode portion 4 and the electrode finger of the detecting movable electrode portion 212 is changed. Accordingly, it is possible to detect the angular velocity which is applied to the physical quantity sensor 10 based the electrostatic capacity.

At this time, among a gap g1 between the electrode finger 41 and the electrode finger of the detecting movable electrode portion 212, and a gap g2 between the electrode finger 42 and the electrode finger of the detecting movable electrode portion 212, one of the gaps is large and the other one is small. Therefore, regarding the electrostatic capacity between the electrode finger 41 and the electrode finger of the detecting movable electrode portion 212, and the electrostatic capacity between the electrode finger 42 and the electrode finger of the detecting movable electrode portion 212, when one electrostatic capacity is increased, the other electrostatic capacity is decreased. Therefore, it is possible to obtain a high output detection signal by differentially amplifying these electrostatic capacities. As a result, it is possible to detect the angular velocity with high accuracy.

As described above, when the detecting fixed electrode portion 4 detects the vibration of each of the detecting portions 21 along the XY plane, and thus when each of the driving portions 24 is driven in the Z-axis direction (out-plane direction), it is possible to detect displacement of each of the detecting portions 21 caused by Coriolis effect which acts on each of the driving portions 24. For this reason, it is possible to realize an angular velocity sensor by the physical quantity sensor 10.

As described above, in the physical quantity sensor 10, each of the beam portions 25 includes a branched portion, and thus it is possible to enhance the bending rigidity of each of the beam portions 25 in the direction in which the Coriolis effect acts on each of the driving portions 24. For this reason, it is possible to efficiently transfer Coriolis effect to the detecting portion 21 from the driving portion 24, and as a result, it is possible to reduce the occurrence of leakage vibration and, to increase the detection accuracy.

Each of the beam portions 25 includes, as described above, two mass portion side beam portions 251 which extend from the two positions in the driving portion 24, which are different from each other, and both end portions on the detecting portion 21 of the two mass portion side beam portions 251 are connected to each other. In addition, each of the beam portions 25 includes, as described above, two supporting portion side beam portion 252 which extend from the two positions in the detecting portion 21, and both end portions on the driving portion 24 of the two supporting portion side beam portion 252 are connected to each other. With such a simple configuration, the beam portions 25 include the mass portion side beam portion 251 and the supporting portion side beam portion 252, and thus it is possible to enhance the rigidity of the beam portion 25 in the direction of the Coriolis effect.

In addition, the width of an end portion on the driving portion 24 side (the section 2511 of the mass portion side beam portions 251) is greater than the middle portion of each of the mass portion side beam portions 251 (the sections 2512 and 2514). In addition, the width of an end portion on the detecting portion 21 side (the section 2521) of each of the support side beam portions 252 is greater than the middle portion of each of the support side beam portions 252 (the sections 2522 and 2524). With this, it is possible to enhance the bending rigidity of the end portions in the X-axis direction, and thus it is possible to enhance the rigidity of the beam portion 25 in the direction of the Coriolis effect with a simple configuration.

Further, in the physical quantity sensor element 1, the two driving portions 24 are caused to vibrate in a reverse phase, and thereby it is possible to more reduce the occurrence of leakage vibration by cancelling the caused vibration. In addition, since the coupling portion 28 connects to one end driving portion 24 (the first mass portion) and the other driving portion 24 (the second mass portion) to each other, it is possible to stabilize the vibration of the two driving portions 24 in the Z-axis direction when these two driving portions 24 are caused to vibrate in a reverse phase.

Particularly, one end portion of the coupling portion 28 is connected to a portion in one driving portion 24 (the first mass portion), and the other end portion of the coupling portion 28 is connected to a portion in the other driving portion 24 (the second mass portion). In addition, the beam portion 29 of one driving portion 24 functions as a "first easily deformable portion" which is deformable so as to reduce the change of posture of the one driving portion 24A with respect to an XY plane corresponding to a reference surface. In the same manner, the beam portion 29 of the other driving portion 24 functions as a "second easily deformable portion" which is deformable so as to reduce the change of posture of the other driving portion 24 with respect to an XY plane corresponding to a reference surface.

Accordingly, when the two driving portions 24 are caused to vibrate through the reverse phase in the Z-axis direction, each of the beam portions 29 is deformed so as to reduce the change of the posture of the two driving portions 24 with respect to XY plane, and thus it is possible to reduce the leakage vibration. From the above description, the physical quantity sensor element 1 and the physical quantity sensor 10 have the excellent detection accuracy.

Here, each of the beam portions 29 extends along the direction (the Y-axis direction) intersecting with the direction (the X-axis direction) in which the two driving portions 24 are arranged in planar view. With this, it is possible to reduce the change of the posture of the two driving portions 24 with respect to the XY plane by twisting each of the beam portions 29. As such, it is possible to reduce the change of the posture of the two driving portions 24 with respect to the XY plane with a relatively simple configuration.

In addition, the beam portions 29 is disposed at a position including the center portion of the corresponding driving portion 24 in planar view. Therefore, it is possible to efficiently reduce the change of the posture of the two driving portions 24 with respect to the XY plane with a relatively simple configuration.

Further, in planar view, the width of each of the beam portions 29 is smaller than the width of the coupling portion 28. With this, it is easy to twist the first easily deformable portion and the second easily deformable portion, and thus it is possible to effectively reduce the change of the posture of the two driving portions 24 with respect to the reference surface. In addition, it is possible to reduce undesirable deformation of the coupling portion 28 and to stabilize the vibration of the two driving portions 24.

In addition, as described above, each of the driving portions 24 includes a gap portion 241 in which a beam portion 29 is disposed. Therefore, it is possible to collectively form two beam portions 29 with two driving portions 24 by processing one substrate. Each of the gap portions 241 prevents the coupling portion 28 from coming in contact with the driving portion 24 while allowing the beam portion 29 to be twisted.

In addition, in planar view, the middle portion of the coupling portion 28 is supported by the support beam portion 27, and thus it is possible to stably rotate the coupling portion 28 around the support beam portion 27 in accordance with the twist deformation the support beam portion 27. As a result, it is possible to stabilize the vibration of the two driving portions 24.

Second Embodiment

Next, the second embodiment of the invention will be described.

Figure 6:
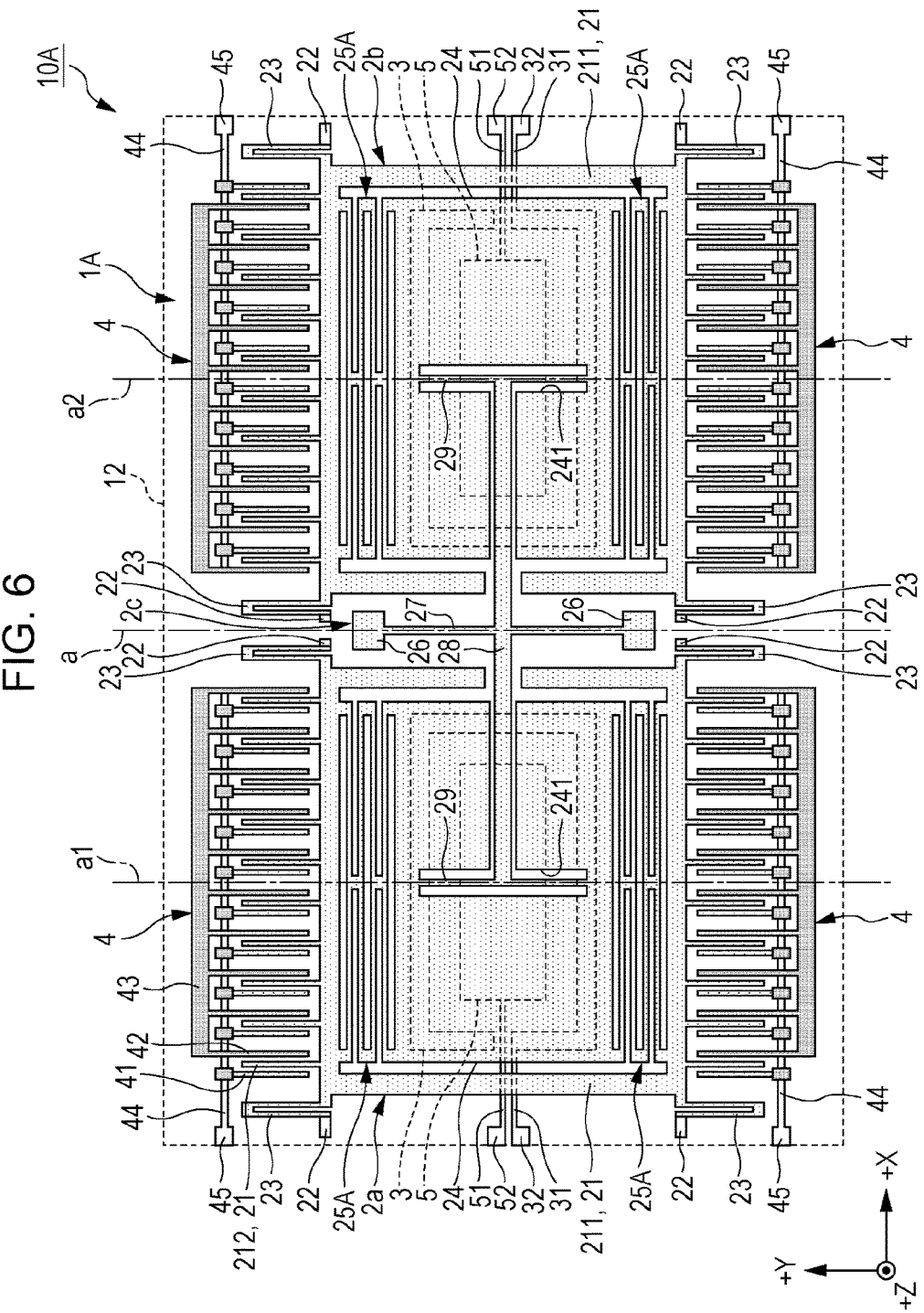
FIG. 6 is a plan view for illustrating a physical quantity sensor according to a second embodiment of the invention.
Figure 7:
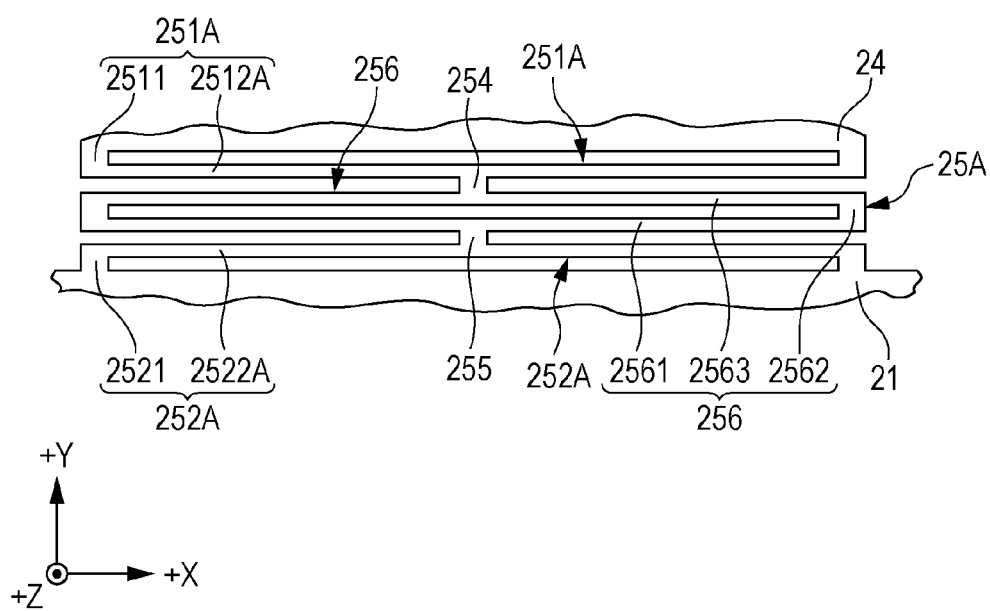
FIG. 7 is an enlarged plan view for illustrating a beam portion with which the physical quantity sensor illustrated in FIG. 5 is provided.

FIG. 6 is a plan view for illustrating a physical quantity sensor according to a second embodiment of the invention, and FIG. 7 is an enlarged plan view for illustrating a beam portion with which the physical quantity sensor illustrated in FIG. 5 is provided.

The description of the second embodiment is the same as that of the first embodiment except that the shape of the beam portion which connects the driving portion (the mass portion) and the detecting portion (the supporting portion) to each other.

Note that, in the following description, in the second embodiment, the description will focus on the differences from the embodiment described above and the same matters will be omitted.

In a physical quantity sensor element 1A which is provided with a physical quantity sensor 10A as illustrated in FIG. 6, instead of the beam portion 25 in the first embodiment described above, a beam portion 25A which connects the detecting portion 21 and the driving portion 24 to each other.

As illustrated in FIG. 7, each of the beam portions 25A is provided with a pair of mass portion side beam portions 251A which extend to the detecting portion 21 (the supporting portion) from the driving portion 24 (the mass portion), and a pair of support side beam portions 252A which extends to the driving portion 24 of the pair of mass portion side beam portions 251A from the detecting portion 21, a connecting beam portion 254 which connects end portions on the side opposite to the driving portion 24 to each other, a connecting beam portion 255 which connects end portions on the side opposite to the detecting portion 21 of the pair of support side beam portions 252A, and a pair of branched beam portion 256 which are provided between the connecting beam portions 254 and 255.

In order to make one mass portion side beam portion 251A and the other mass portion side beam portion 251A face each other, the pair of mass portion side beam portions 251A extend toward the detecting portion 21 from the driving portion 24, and end portions of the pair of mass portion side beam portions 251A, which are on the side opposite to the driving portion 24, are connected to each other.

Each of the mass portion side beam portions 251A is provided with a section 2511 which extends along the Y-axis direction from the driving portion 24, and a section 2512A which extends in the direction along the X-axis direction from the end portion on the side opposite to the driving portion 24 of the section 2511.

In the same manner, the pair of support side beam portions 252A extends toward the driving portion 24 from the detecting portion 21 in such a manner that one end portion of the support side beam portions 252A faces the other end of the support side beam portions 252A, and both end portions on the side opposite to the detecting portion 21 of the pair of support side beam portions 252A are connected to each other.

Each of the support side beam portions 252A is provided with a section 2521 which extends along the Y-axis direction from the detecting portion 21, and a section 2522A which extends in the direction along the X-axis direction from the end portion on the side opposite to from the detecting portion 21 of the section 2521.

The connecting beam portion 254 extends along the Y-axis direction, and one end portion thereof is connected to an end portion (that is, an end portion on the side opposite to the section 2512A of the section 2511) on the side opposite to the driving portion 24 of each of the mass portion side beam portions 251A, and the other end portion thereof is connected to one end portion of the pair of branched beam portions 256.

In the same manner, the connecting beam portion 255 extends along the Y-axis direction, and one end portion thereof is connected to an end portion (that is, an end portion on the side opposite to the section 2522A of the section 2521) on the side opposite to the detecting portion 21 of each of the mass portion side beam portions 252A, and the other end portion thereof is connected to the other end portion of the pair of branched beam portions 256.

The pair of branched beam portions 256 are branched from and connected to the connecting beam portion 254 and the connecting beam portion 255. Each of the beam portions 256 is provided with a section 2561 which extends along the Y-axis direction from an end portion on the side opposite to the mass portion side beam portion 251A of the connecting beam portion 254, and a section 2563 which extends along Y-axis direction, which is the same direction of the section 2561, from an end portion on the side opposite to the supporting portion side beam portion 252A of the connecting beam portion 255, and a section 2562 which connects end portions on the side opposite to the connecting beam portions 254 and 255 of the sections 2561 and 2563.

As described, in the physical quantity sensor element 1A and the physical quantity sensor 10A, the beam portion 25A is provided with two branched beam portions 256 which are branched from the middle of the beam portion 25A, in which both end portions on the driving portion 24 side of the two branched beam portions 256 are connected to each other, and both end portions on the detecting portion 21 side of the two branched beam portions 256 are connected to each other. With such a simple configuration, it is possible to enhance the rigidity of the beam portion 25A in the direction of the Coriolis effect.

2. Electronic Equipment

Figure 8:
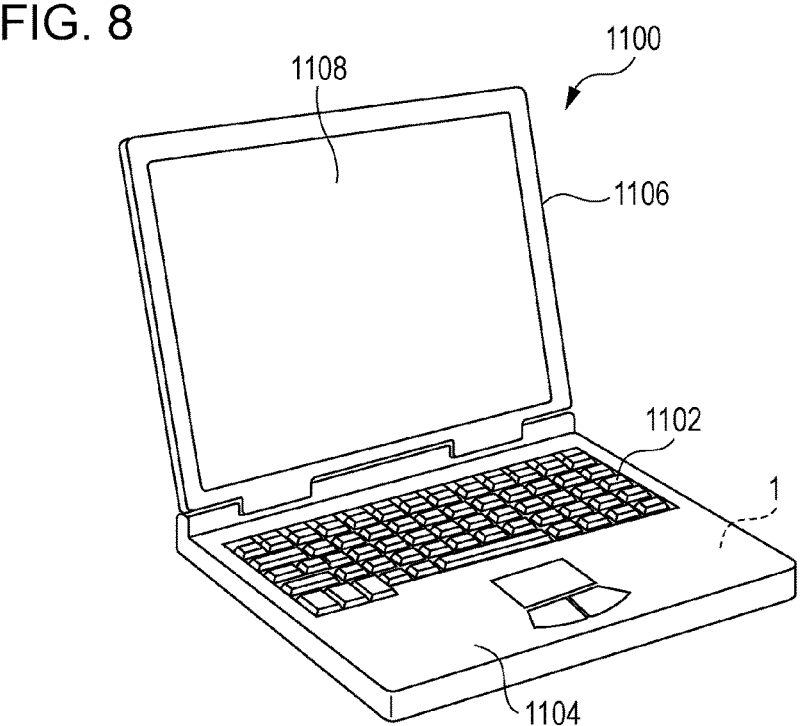
FIG. 8 is a schematic perspective view of a configuration of a mobile type personal computer of an example of electronic equipment of the invention.
Figure 9:
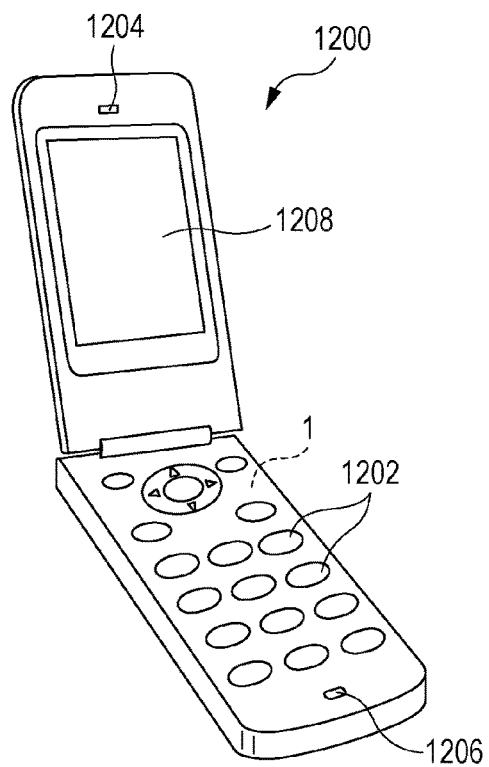
FIG. 9 is a schematic perspective view of a configuration of a mobile phone which is an example of the electronic equipment of the invention.
Figure 10:
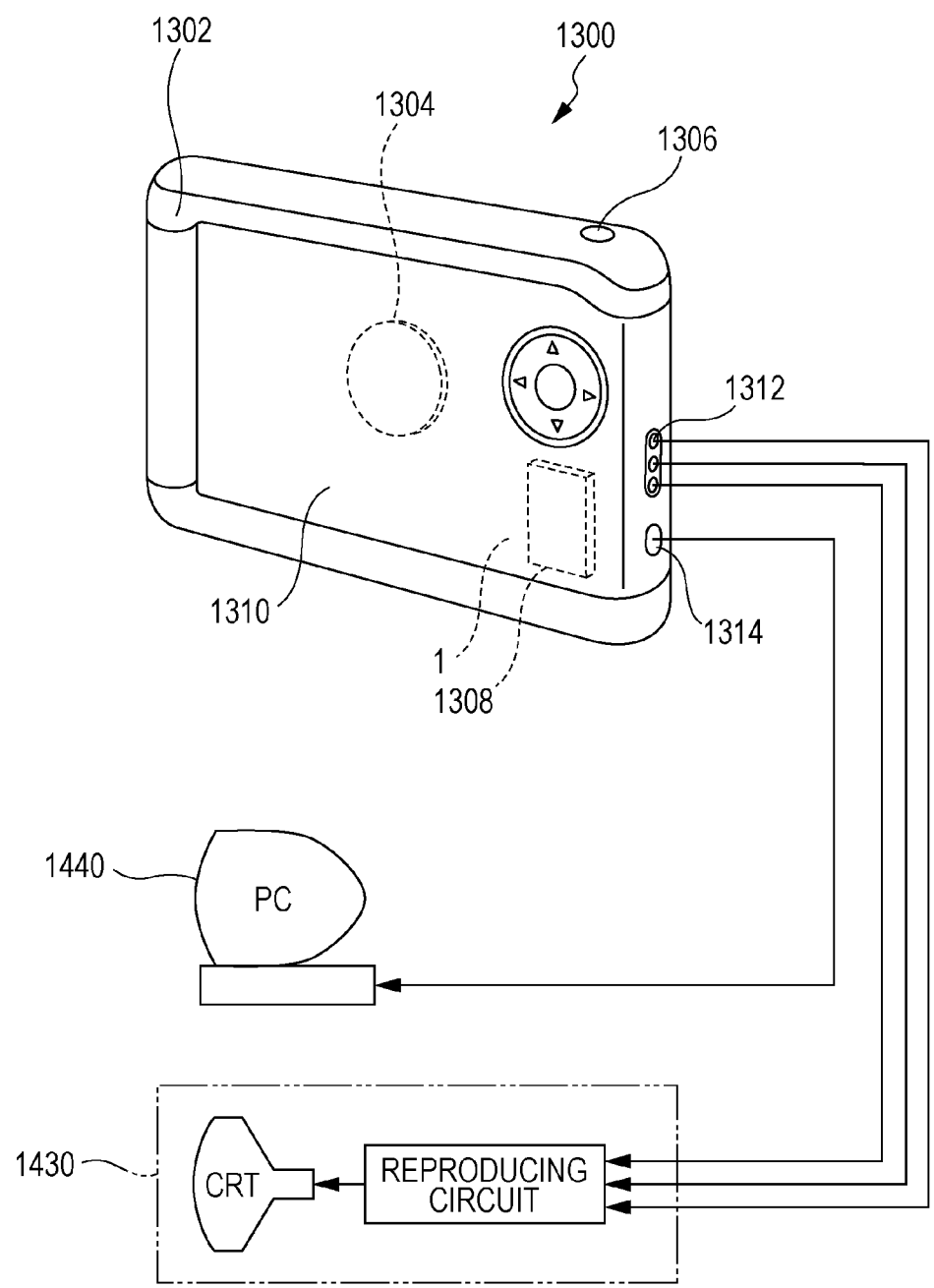
FIG. 10 is a perspective view of a configuration of a digital still camera which is an example of the electronic equipment of the invention.

Next, the electronic equipment using the physical quantity sensor element 1 will be specifically described based on FIG. 8 to FIG. 10.

FIG. 8 is a perspective view of a configuration of a mobile phone which is a mobile personal computer of the equipment of the invention.

In FIG. 8, a personal computer 1100 is formed of a main body portion 1104 which is provided with a key board 1102, and a display unit 1106 which is provided with a display 1108, and the display unit 1106 is rotatably supported with respect to a main body portion 1104 via a hinge structure. The physical quantity sensor element 1 which functions as a gyro sensor is built in the personal computer 1100.

FIG. 9 is a perspective view of a configuration of a mobile phone which is an example of the equipment of the invention.

In FIG. 9, the mobile phone 1200 is provided with a plurality of operation buttons 1202, an ear piece 1204, and a mouth piece 1206, and a display 1208 is disposed between the operation button 1202 and the ear piece 1204. The physical quantity sensor element 1 which functions as a gyro sensor is built in the mobile phone 1200.

FIG. 10 is a perspective view of a configuration of a digital still camera which is an example of the equipment of the invention. In addition, in FIG. 10 simply illustrates the connection to the external device. Here, in a general camera, a silver salt film is exposed to the light by an optical image of the object, whereas in the digital still camera 1300, the optical image of the object is by photoelectrically converted into an imaging signal (an image signal) by using an imaging element such as a charge coupled device (CCD).

The display is provided on the back surface of the case (body) 1302 in digital still camera 1300, and is configured to display based on the image signal by using the CCD, and the display 1310 is functions as a finder for displaying the object as an electronic image.

In addition, a light receiving unit 1304 which includes an optical lens (an imaging optical system), the CCD, and the like is provided on the front side (on the rear surface side in FIG. 10) of the case 1302.

When a photographer confirms a target image displayed on the display, and presses a shutter button 1306, an image signal of the CCD is transferred and stored in the memory 1308.

In addition, in the digital still camera 1300, a video signal output terminal 1312, and an input and output terminal 1314 for data communication are provided on the side surface of the case 1302. In addition, as illustrated in FIG. 10, a television monitor 1430 is connected to the video signal output terminal 1312, and a personal computer 1440 is connected to the input and output terminal 1314 for data communication, as required. Further, through a predetermined operation, the image signal stored in the memory 1308 is output from the television monitor 1430 or the personal computer 1440.

The physical quantity sensor element 1 which functions as the gyro sensor is built in the digital still camera 1300.

Note that, in addition to the personal computer (a mobile personal computer) in FIG. 8, the mobile phone in FIG. 9, and the digital still camera in FIG. 10, examples of the electronic equipment which is provided with the physical quantity sensor element of the invention include an ink jet ejecting device (for example, an ink jet printer), a laptop personal computer, a television, a video camera, a video tape recorder, a car navigation device, a pager, an electronic notebook (including communication functions), an electronic dictionary, an electronic calculator, an electronic game device, a word processor, a workstation, a videophone, a security television monitor, an electronic binocular, a POS terminal, medical equipment (for example, an electronic thermometer, a blood pressure monitor, a blood glucose meter, an electrocardiogram measuring device, an ultrasonic diagnostic device, and an electronic endoscope), a fish finder, various measuring devices, an instrument (for example, a vehicle, an aircraft, and a ship gauge), a flight simulator, and the like.

3. Movable Body

Figure 11:
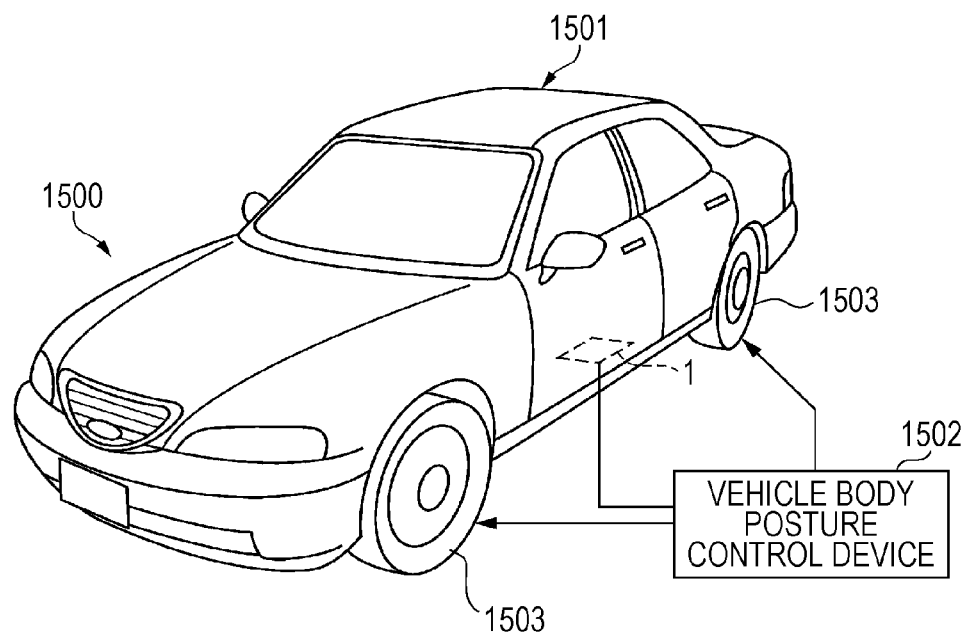
FIG. 11 is a perspective view of a configuration of a vehicle which is an example of a movable body of the invention.

Next, a movable body by using the physical quantity sensor element 1 will be specifically described based on FIG. 11.

FIG. 11 is a perspective view of a configuration of a vehicle which is an example of a movable body of the invention.

The physical quantity sensor element 1 which functions as a gyro sensor is built in a vehicle 1500, and it is possible to detect posture of a vehicle body 1501 by the physical quantity sensor element 1. The detected signal from the physical quantity sensor element 1 is supplied a vehicle body posture control device 1502, and the vehicle body posture control device 1502 detects the posture of the vehicle body 1501 based on the detected signal, and thus it is possible to control the hardness of suspension according to a detection result and to control the brake of each of wheels 1503. In addition, it is possible to control the posture by using a bipedal robot and a radio-controlled helicopter. As described above, in order to realize the posture control of the various movable bodies, the physical quantity sensor element 1 is built in the vehicle 1500.

As described above, the physical quantity sensor element, the physical quantity sensor, the electronic equipment, and the movable body of the invention are described with reference to the drawings of the embodiments; however, the invention is not limited thereto. For example, the configuration of each portion can be replaced with any configuration which exhibits the same function in the invention. In addition, any other components may be added to the invention.

The entire disclosure of Japanese Patent Application No. 2014-181047, filed Sep. 5, 2014 is expressly incorporated by reference herein.

What is claimed is:

1. A physical quantity sensor element comprising:
   a supporting portion having a first supporting portion and a second supporting portion that vibrate along a reference surface;
   a mass portion having a first mass portion and a second mass portion;
   a beam portion which connects the supporting portion and the mass portion to each other, the beam portion having a first beam portion connecting the first mass portion and the first supporting portion and a second beam portion connecting the second mass portion and the second supporting portion;
   a coupling portion which connects the first mass portion and the second mass portion to each other; and
   an electrode which detects the vibration of the first supporting portion and the second su porting portion along the reference surface,
   wherein the beam portion includes a branched portion with ends attaching to opposing corners of the mass portion, and
   wherein the supporting portion is fixed to a substrate.

2. The physical quantity sensor element according to claim 1,
   wherein the beam portion includes two mass portion side beam portions which extend from two positions in the mass portion, which are different from each other, and
   wherein both end portions on the supporting portion side of the two mass portion side beam portions are connected to each other.

3. The physical quantity sensor element according to claim 2,
   wherein a width of an end portion on the mass portion side of each of the mass portion side beam portions is greater than a width of a middle portion of each of the mass portion side beam portions.

4. The physical quantity sensor element according to claim 2,
   wherein the beam portion includes two supporting portion side beam portions which extend from the two positions in the supporting portion, which are different from each other, and
   wherein both end portions on the mass portion side of the two supporting portion side beam portions are connected to each other.

5. The physical quantity sensor element according to claim 4, further comprising:
   a first mass portion and a second mass portion which respectively form the mass portion;
   a first supporting portion and a second supporting portion which respectively form the supporting portion;
   a first beam portion which forms the beam portion for connecting the first mass portion and the first supporting portion;
   a second beam portion which forms the beam portion for connecting the second mass portion and the second supporting portion; and
   a coupling portion which connects the first mass portion and the second mass portion to each other.

6. The physical quantity sensor element according to claim 5,
   wherein one end portion of the coupling portion is connected to a portion in the first mass portion, and the other end portion of the coupling portion is connected to a portion in the second mass portion,
   wherein the first mass portion is connected to the one end portion of the coupling portion, and includes a first easily deformable portion which is deformable so as to reduce a change of a posture of the first mass portion with respect to a reference surface, and
   wherein the second mass portion is connected to the other end portion of the coupling portion, and includes a second easily deformable portion which is deformable so as to reduce a change of a posture of the second mass portion with respect to the reference surface.

7. The physical quantity sensor element, according to claim 6,
   wherein the first mass portion includes a first gap portion in which the first easily deformable portion is disposed, and
   wherein the second mass portion includes a second gap portion in which the second easily deformable portion is disposed.

8. The physical quantity sensor element according to claim 1,
   wherein the beam portion includes two supporting portion side beam portions which extend from the two positions in the supporting portion, which are different from each other, and wherein both end portions on the mass portion side of the two supporting portion side beam portions are connected to each other.

9. The physical quantity sensor element according to claim 8,
wherein a width of the end portion on the supporting portion side of each of the supporting portion side beam portions is greater than a width of a middle portion of each of the supporting portion side beam portions.

10. The physical quantity sensor element according to claim 1,
wherein the beam portion includes two branched beam portions which are branched from the middle of the beam portion, and
wherein both end portions on the mass portion side of the two branched beam portions are connected to each other, and both end portions on the supporting portion side of the two branched beam portions are connected to each other.

11. The physical quantity sensor element according to claim 1,
wherein one end portion of the coupling portion is connected to a portion in the first mass portion, and the other end portion of the coupling portion is connected to a portion in the second mass portion,
wherein the first mass portion is connected to the one end portion of the coupling portion, and includes a first easily deformable portion which is deformable so as to reduce a change of a posture of the first mass portion with respect to the reference surface, and
wherein the second mass portion is connected to the other end portion of the coupling portion, and includes a second easily deformable portion which is deformable so as to reduce a change of a posture of the second mass portion with respect to the reference surface.

12. The physical quantity sensor element according to claim 11,
wherein the first mass portion includes a first gap portion in which the first easily deformable portion is disposed, and
wherein the second mass portion includes a second gap portion in which the second easily deformable portion is disposed.

13. A physical quantity sensor comprising:
the physical quantity sensor element according to claim 1; and
a package which stores the physical quantity sensor element.

14. The physical quantity sensor element comprising:
a supporting portion having a first supporting portion and a second supporting portion, the supporting portion being fixed to a substrate;
a mass portion having a first mass portion and a second mass portion;
a first beam portion connecting the first mass portion and the first supporting portion;
a second beam portion connecting the second mass portion and the second supporting portion; and
a coupling portion which connects the first mass portion and the second mass portion to each other,
wherein the first beam portion and the second beam portion each include a branched portion with ends attaching to opposing corners of the respective first mass portion and second mass portion, two mass portion side beam portions which extend from two positions in the respective first mass portion and second mass portion, which are different from each other, and two supporting portion side beam portions which extend from the two positions in the respective first supporting portion and second supporting portion, which are different from each other,
wherein both end portions on the supporting portion side of the two mass portion side beam portions are connected to each other,
wherein both end portions on the mass portion side of the two supporting portion side beam portions are connected to each other,
wherein one end portion of the coupling portion is connected to a portion in the first mass portion and the other end portion of the coupling portion is connected to a portion in the second mass portion,
wherein the first mass portion is connected to the one end portion of the coupling portion, and includes a first easily deformable portion which is deformable so as to reduce a change of a posture of the first mass portion with respect to a reference surface, and the second mass portion is connected to the other end portion of the coupling portion, and includes a second easily deformable portion which is deformable so as to reduce a change of a posture of the second mass portion with respect to the reference surface,
wherein the first mass portion includes a first gap portion in which the first easily deformable portion is disposed and the second mass portion includes a second gap portion in which the second easily deformable portion is disposed,
wherein the first supporting portion and the second supporting portion vibrate along the reference surface, and
an electrode detects the vibration of the first supporting portion and the second supporting portion along the reference surface.

* * * * *